Jan. 21, 1936.　　　V. BENDIX ET AL　　　2,028,583
BRAKE
Filed June 3, 1929　　　3 Sheets-Sheet 1
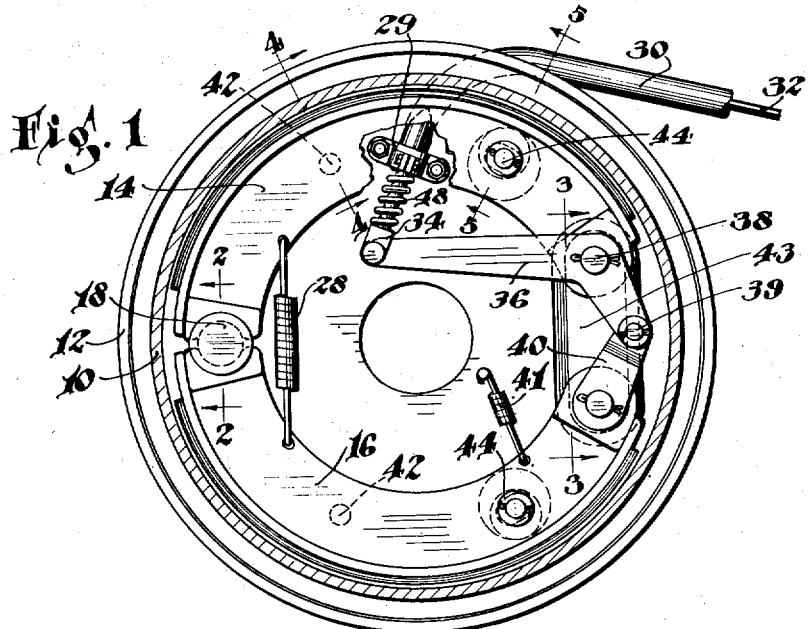
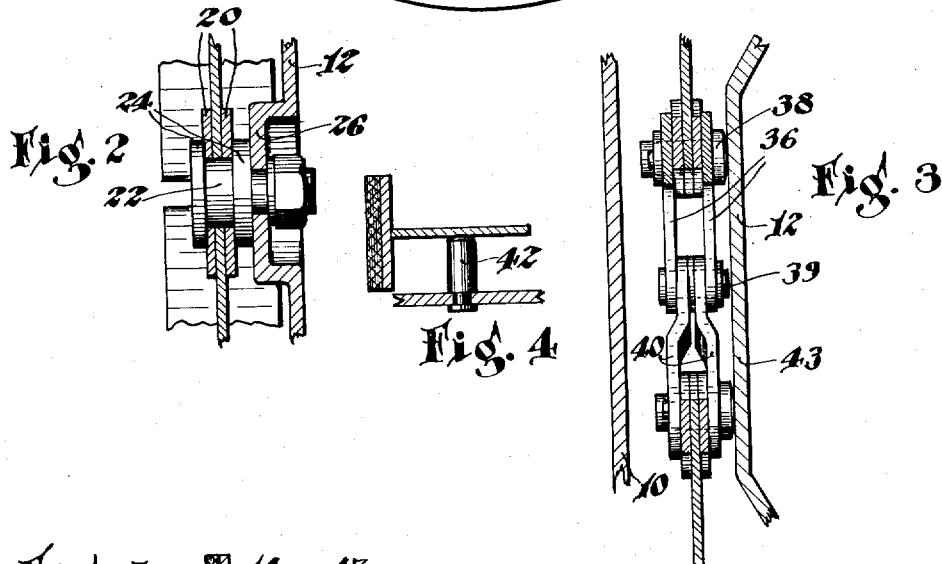
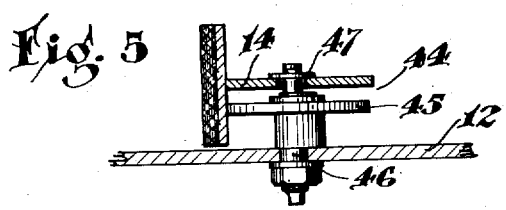
INVENTORS
Vincent Bendix
Ludger E. LaBrie
BY
H. O. Clayton
ATTORNEY Jan. 21, 1936.　　　V. BENDIX ET AL　　　2,028,583
BRAKE
Filed June 3, 1929　　　3 Sheets-Sheet 2

INVENTORS
Vincent Bendix
Ludger E. LaBrie
BY
ATTORNEY

Jan. 21, 1936.   V. BENDIX ET AL   2,028,583
BRAKE
Filed June 3, 1929   3 Sheets-Sheet 3
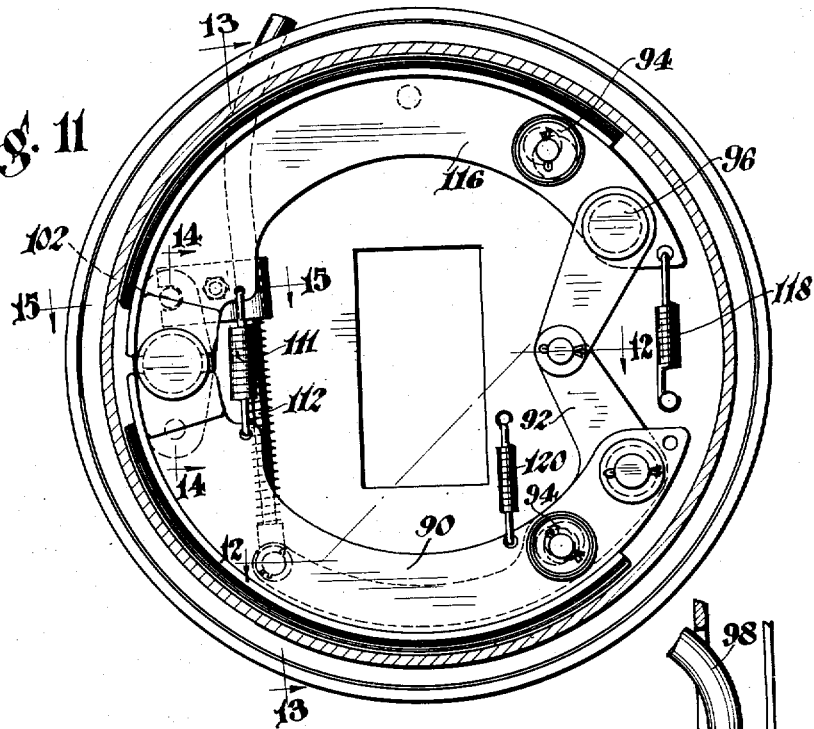
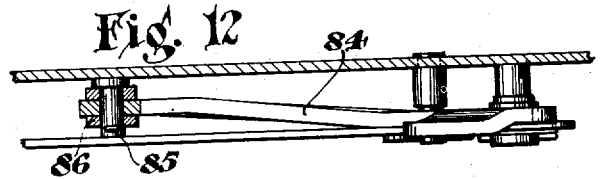
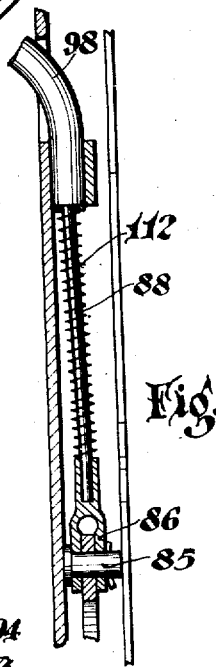
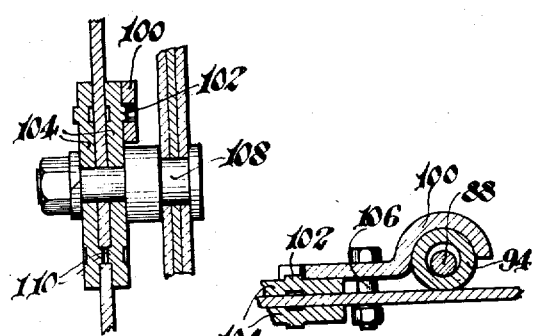
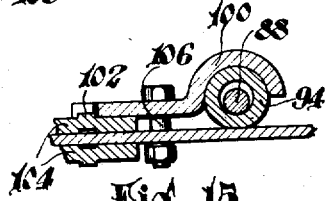
INVENTORS
Vincent Bendix
Ludger E. LaBrie
BY
H. O. Clayton
ATTORNEY Patented Jan. 21, 1936

2,028,583

UNITED STATES PATENT OFFICE 2,028,583

BRAKE

Vincent Bendix, Chicago, Ill., and Ludger E. La Brie, South Bend, Ind., assignors to Bendix Brake Company, South Bend, Ind., a corporation of Illinois Application June 3, 1929, Serial No. 367,900

10 Claims. (Cl. 188—78)

This invention relates to brakes and is illustrated as embodied in an internal expanding brake for an automotive vehicle.

An object of the invention is to secure reliable but inexpensive connections for operating brakes of this type wherein an operating lever, preferably of the bell-crank type, is actuated by a flexible tension element, the lever being fulcrumed upon one end of a friction element and pivotally connected at its applying end to a thrust link pivotally connected to a second friction element. In such a construction we contemplate the provision of an applying means wherein a primary friction element is applied by the direct lifting of the same by the lever pivotally connected to its end and which applying action is augmented by a toggle action of the lever and a connected thrust link. Two spaced friction elements are thus applied to the rotating drum by actuating means comprising a bell-crank lever and a thrust link, one of said elements receiving the combined effect of a lifting action and a toggle action and the remaining element being applied solely by the toggle action.

A further feature of the brake mechanism resides in a novel arrangement of the parts whereby a return spring acting between and upon a brake support plate and an applying lever serves to successively move friction elements of the brake into their released or inoperative position.

We also contemplate the provision of novel means for dampening vibration of the brake shoes and to this end a plurality of laterally extending spaced supports are provided, which supports are firmly pressed against a side of a web portion of the shoe. The objectionable brake squeal caused in part by vibration of the shoes is thus obviated to this extent.

Further features of the invention relate to a relatively long applying lever within the brake; to a novel combination of brake elements comprising a pivoted lever and thrust link, and friction elements, the latter disconnectedly engaging a fixed abutment, serving as an anchor post, and which lies diametrically opposite the aforementioned lever and link to various novel types of bell crank operating levers; to a novel clamping means for the end of a cable conduit, which clamping means is secured to the backing plate; to a novel floating eccentric adjustment for the brake shoes passing through the pivotal connection between the aforementioned thrust link and the end of the brake shoe and to various other combinations of parts and desirable particular constructions, which will become apparent from the following description of one illustrative embodiment shown in the accompanying drawings, in which:

Figure 1 is a vertical section taken through the brake drum just inside the head thereof disclosing parts of the brake in side elevation;

Figure 2 is a partial transverse sectional view on the line 2—2 of Figure 1 showing one form of anchor for the juxtaposed shoes;

Figure 3 is a partial sectional view taken on the line 3—3 of Figure 1 disclosing parts of one form of applying mechanism in detail;

Figures 4 and 5 are sections taken on the lines 4—4 and 5—5 of Figure 1 showing, respectively, a steady rest and a combined steady rest and eccentric stop.

Figure 6:
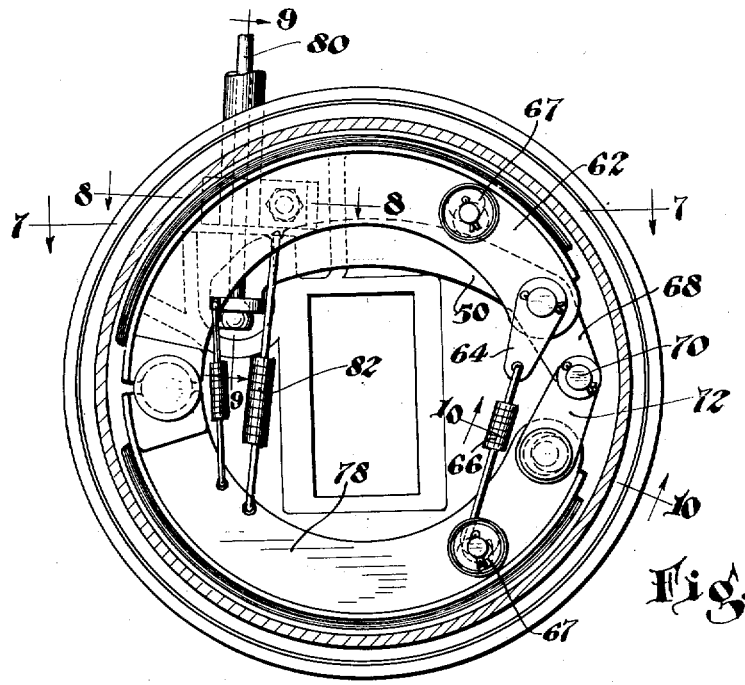
Figure 7:
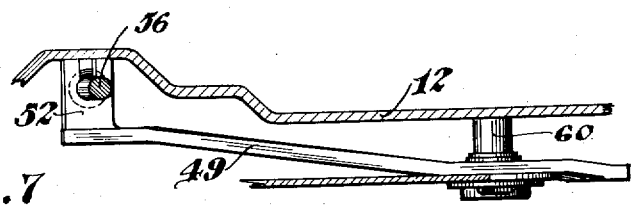
Figure 8:
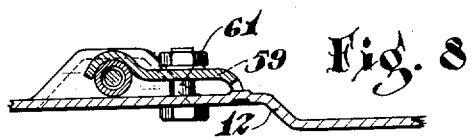
Figure 9:
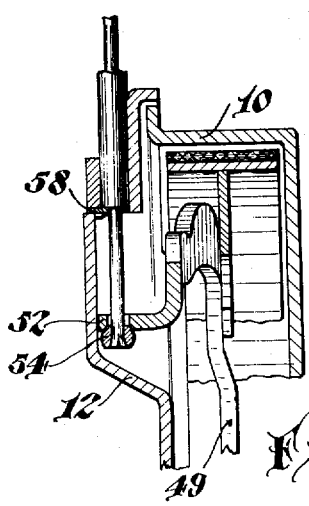
Figure 10:
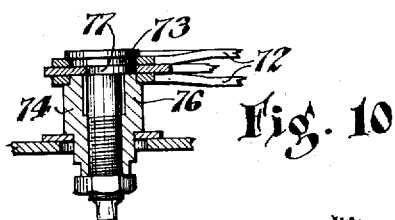

Figure 6 is a view similar to Figure 1 showing a modified form of bell-crank operating lever;

Figure 7 is a partial section taken on the line 7—7 of Figure 6 and showing in detail the major portion of the lever;

Figure 8 is a transverse section taken on the line 8—8 of Figure 6 and showing in detail the pressed out brake support plate and cable clip;

Figures 9 and 10 are sections taken respectively on the lines 9—9 and 10—10 of Figure 6 and disclosing in detail the cable and lever connection and the eccentric adjustment for the shoes.

Figure 11 is a view similar to Figures 1 and 6 showing a modified form of operating bell-crank positioned at the bottom of the brake;

Figure 12 is a section taken on the line 12—12 of Figure 11 showing in detail the lever operating means;

Figure 13 is a section taken on the line 13—13 of Figure 11 showing the cable and lever connection;

Figure 14 is a section on the line 14—14 of Figure 11 showing a modified form of anchor structure; and Figure 15 is a section on the line 15—15 of Figure 11 showing in detail the novel clip for securing the cable conduit in position.

In that embodiment of our invention disclosed in Figure 1, we have provided within the usual rotatable brake drum 10 and brake support plate 12 a pair of T-sectioned brake shoe members 14 and 16 anchored at contiguous ends upon a common anchor post 18 fixedly secured to the support plate. The anchored ends of the webs of the shoes are preferably provided with reinforcing thrust plates 20 welded or otherwise permanently secured thereto, the plates and web of each shoe being recessed to abut the shank portion 22 of the anchor, all as clearly disclosed in Figure 2 of the drawings. Anchor post 18 is preferably provided with spaced flanges 24 to confine the shoes laterally, the inner flange abutting an indentation 26 in the brake support plate. A suitable spring member 28 secured to the webs of the shoes serves to maintain the shoes in contact with the anchor post.

According to an important feature of our invention, there is arranged at the top of the brake as shown in Figure 1, a small casting 29 secured to the support plate and serving as a fitting to house one end of a flexible Bowden type conduit 30. The flexible tension element, such as a wire cable 32, is passed through the conduit and pivotally secured at its clevised end 34 to one end of a relatively long bell crank lever 36. Lever 36 may comprise two parallel stampings as shown in Figure 3 and is preferably pivotally connected or fulcrumed by pivot pin 38 to the built-up end of the upper shoe 14. The end of the short arm of the bell crank lever may be pivotally connected as by pin 39 to one end of two stampings 40 jointly constituting a thrust or compression link and which stampings are outwardly bent and pivotally connected at their other spaced apart ends to the built-up end of the lower T-sectioned brake shoe 16. A spring 41 secured at its ends to the support plate 12 and lower shoe 16 serves to return said shoe 16 to its inoperative position upon release of the applying means.

One feature of our invention relates to obviating objectionable noises in the brake due to vibration of the shoe members and to this end there are provided short pins or posts 42 secured to the backing plate and which pins serve to position the shoes laterally, guide them during their movement within the brake, and lastly function as a means to dampen vibrations set up in the shoe. The dampening function of the post 42 is supplemented by the pivot pins 38 and 39, which slidingly contact the backing plate at its raised portion 43, and also by the flanges 24 on the anchor. The released position of shoes 14 and 16 may be determined by the combined adjustable eccentric stop and steady rest 44 of Figure 5, which member also serves to dampen vibration set up in the shoe. A roller 45 functioning as a stop is eccentrically mounted on adjustable pin 46, the latter being continued through an opening in the shoe to provide with the washer 47 a lateral guide or "steady rest."

With application of force to the cable 32 a lifting action is exerted upon the end of the bell-crank 36 against the resistance of a compression spring 48 interposed between the fitting 29 and the cable clevis. The primary shoe 14 is thus bodily lifted into drum engagement. With the shoe 14 in engagement with the drum, further movement of the lever 36 serves to thrust shoe 16 into drum engagement through the intermediary of thrust links 40, the lever fulcruming at 38, its short arm and the thrust links 40 acting as a toggle. With both shoes in drum engagement and with continued pull upon the lever from the service pedal the action of the operating means may be described as a full toggle effect upon shoe 16 and a combined lifting and toggle effect upon shoe 14. With the drum rotating counter-clockwise in the left front brake of Figure 1, shoe 16 becomes self-actuating and receives the effect of a very powerful applying action and with the drum rotating clockwise with reverse braking, shoe 14 becomes self-actuating and receives a powerful toggle applying action. With release of the pressure upon the service pedal the shoes are released under the joint action of the springs 41 and 48 and the action of gravity upon shoe 14.

Anchor 18 with its flanges 24, the posts 42, the members 44 and the pins 38 and 39 all unite in dampening vibration set up in the shoes, the several elements being so spaced as to effect that function.

It will be observed that the drum 10 and the backing plate 12 in effect form a closed brake chamber or housing for the brake friction means, and that the flexible conduit 30 is secured to the backing plate at its end in such a manner as to communicate with the brake chamber, so that the conduit in effect forms a flexible extension of the brake chamber.

The cable 32, or an equivalent flexible element, passes through the flexible extension or conduit 30 directly into the brake chamber, and is there connected to the floating lever 36, or an equivalent device.

In Figure 6 we have disclosed a modified form of lever mechanism wherein the long arm 49 of a one piece bell crank lever 50 is offset as shown in Figure 7 and provided at its end with a right angularly extending portion 52 slotted to accommodate the ball end 54 of a flexible cable 56. The backing plate is double offset as shown in Figures 6 and 7 to accommodate the lever end 52 and is further cut away at 58 to provide a ledge to support the conduit fastening clip 59 of Figure 8 which is preferably detachably secured to the backing plate by a bolt 61. Clip 59 is curved at its end to surround the conduit, the latter being pressed into engagement with the support plate 12 by the clip. Lever 50 is preferably pivoted by pin 60 to the brake shoe 62, the pin 60 slidingly contacting the plate 12 to laterally support and guide the shoe in its movement. A clip 64 may be journaled on the pin to the end of which is secured one end of a return spring 66, said spring being secured at its other end to an eccentrically mounted stop 67.

The short arm 68 of the bell-crank lever may be pivotally connected at 70 to thrust links 72, the latter journaled at their ends upon the head 73 of an adjusting pin 74 and upon the reduced end of a spacer sleeve 76, the latter surrounding the pin 74. Pin 74 may be provided with an eccentrically mounted circular flange 77 fitting within a correspondingly shaped opening in the web of the brake shoe 78. Rotation of the pin 74 effects, through the flange 77, a movement of the shoe 78 either away from or toward the brake drum, this compensating for lining wear. The stops 67 are also changed to co-operate with the adjusted shoe in giving a predetermined lining clearance.

In operation, actuation of the lever by the cable 80 serves to give the combined lifting and toggle action as described in connection with the brake of Figure 1, the lever movement being counteracted by a return spring 82 secured at its ends to the lever and shoe 78. With release of the lever, springs 82 and 66 serve to return both the shoes and lever to their inoperative position, the rims of the shoes contacting the stops 67.

In that embodiment of our invention disclosed in Figure 11, the brake actuating bell-crank lever is positioned at the bottom of the brake, the long arm 84 thereof being pivotally connected by pin 85 to a clevis 86 at one end of the flexible operating cable 88. Pin 85 has a sliding contact with both the web of the lower brake shoe 90 and the brake support plate, the lever being thus guided and steadied during its applying movement. The lever is pivoted to the lower shoe 90 as in Figures 6 and 7, the short arm 92 in this modification extending inwardly to position the hub of the toggle nearer the center of the brake. This construction gives a radial component of thrust not present in the brake of Figure 6. This brake is also provided with eccentric stops 94 and the novel shoe adjusting construction 96, as disclosed in Figure 10. As an additional feature of this brake, I prefer to anchor the end of conduit 98 to the support plate by means of a clip or stamping 100 which is preferably recessed at one end to fit projection 102 on a novel anchor pin reinforcing plate 104. Clip 100 is cupped at one end to surround the conduit and is preferably detachably secured to the support plate by a bolt 106, all as clearly disclosed in Figure 15.

The anchor pin 108, similar in construction to the pin 18 of Figure 1, may be reinforced at its connection with the brake support plate by stampings 104 which may be provided at one side of the pin 108 with projections 110 anchored within correspondingly shaped openings in the support plate. A spring 111 serves to retain the ends of the shoes in engagement with their anchor pin.

In operation of the brake of Figure 11 application of the cable 88, against the resistance of a compression spring 112, serves to apply the shoe 116 against the resistance of a spring 118 secured to the upper shoe 116 and the support plate. With the upper shoe 116 in drum engagement further movement of the lever serves to open the toggle to apply pressure to both of the shoes. With release of the pedal pressure, springs 111, 118 and 120 serve to return the shoes to their inoperative position against the stops 94.

While several illustrative embodiments have been described in detail, it is not our intention to limit the scope of the invention to those particular embodiments, or otherwise than by the terms of the appended claims.

We claim:

1. A brake comprising, in combination, friction elements supported within a rotatable drum by a support plate, applying means for said elements comprising a pair of thrust links, said links being journaled at their ends upon adjusting means comprising a pin and sleeve enveloping said pin, which latter members are extended through a slot in said support plate.

2. In a brake construction, a support plate having a depressed portion, said portion being cut away to provide a pilot support for a brake operating member and a clamping plate therefor.

3. In a brake mechanism, a support plate and friction elements mounted on said plate, each of said elements having a part thereof extending substantially parallel to said support plate and operating means for said friction elements comprising a lever having a relatively long arm extending between said support and the aforementioned portion of the brake elements parallel to said support, said lever arm being pivoted at its end to means slidingly contacting said parallel members to guide said operating arm in its movement.

4. In a brake mechanism, a support plate and friction elements mounted on said plate, each of said elements having a part thereof extending substantially parallel to said support plate and operating means for said friction elements comprising a lever having a relatively long arm extending between said support and the aforementioned portion of the brake elements parallel to said support, said lever arm being pivoted at its end to means slidingly contacting said parallel members to guide said operating arm in its movement, in combination with a flexible cable pivotally connected to said guide means, said cable also extending between said parallel members.

5. A brake comprising an anchor member extending through a brake support plate, reinforcing stampings at said anchor member abutting said plate, said stampings having projections thereon interfitting with correspondingly shaped recesses in said plate, said plates having other similarly shaped projections extending from the opposite sides of said plates, one of said projections functioning as a positioning means for a clip member.

6. A brake comprising, in combination, a drum and a backing plate jointly forming a substantially closed brake chamber, a pair of shoes housed within said chamber and having separable ends and having an anchorage for their opposite ends carried by the backing plate, bodily shiftable applying means acting on said ends and unrestrained by said anchorage and by the backing plate and carried by said shoes only, a flexible conduit secured to said plate at one end and communicating with said chamber at said end and forming in effect a flexible extension of the brake chamber, and a flexible tension element extending through the conduit into said brake chamber and there connected to the applying means.

7. A brake comprising a drum and a backing plate jointly forming a substantially closed brake chamber, friction means within said chamber having separable ends and having a curved friction face engageable with the drum and having a stiffening web paralleling the backing plate, a lever acting on said ends and bodily movable independently of the backing plate and arranged in the space between the backing plate and said web, a flexible conduit secured at its end to the backing plate and communicating at said end with the brake chamber and forming in effect a flexible extension of the brake chamber, and a flexible tension element extending through said conduit into the brake chamber and there connected to said lever.

8. A brake comprising a drum and a backing plate jointly forming a substantially closed brake chamber, friction means within said chamber having separable ends and having a curved friction face engageable with the drum and having a stiffening web paralleling the backing plate, a lever acting on said ends and bodily movable independently of the backing plate and arranged in the space between the backing plate and said web, and a flexible tension element extending through said backing plate into the brake chamber and there connected to said lever.

9. A brake comprising a drum and a backing plate jointly forming a substantially closed brake chamber, friction means within said chamber having separable ends and having a curved friction face engageable with the drum and having a stiffening web paralleling the backing plate, an applying device acting on said ends and bodily movable independently of the backing plate and arranged in the space between the backing plate and said web, a flexible conduit secured at its end to the backing plate and communicating at said end with the brake chamber and forming in effect a flexible extension of the brake chamber, and a flexible tension element extending through said conduit into the brake chamber and there connected to said applying device.

10. A brake comprising a drum and a backing plate jointly forming a substantially closed brake chamber, friction means within said chamber having separable ends and having a curved friction face engageable with the drum and having a stiffening web paralleling the backing plate, an applying device acting on said ends and bodily movable independently of the backing plate and arranged in the space between the backing plate and said web, and a flexible tension element extending through said backing plate into the brake chamber and there connected to said applying device.

VINCENT BENDIX.
LUDGER E. LA BRIE.

CERTIFICATE OF CORRECTION.

Patent No. 2,028,583.   January 21, 1936.

VINCENT BENDIX, ET AL.

It is hereby certified that error appears in the printed specification of the above numbered patent requiring correction as follows: Page 3, first column, line 48, after the words and colon "We claim:" insert the following as claim 1:

> 1. A brake comprising, in combination, friction elements spaced apart at adjacent ends by applying means comprising a bell-crank lever pivoted to one end of one of said elements, said lever having one of its arms offset from the plane of the lever and further provided at its offset end with a laterally directed slotted end piece.

The claims now appearing in the patent as numbers 1, 2, 3, 4, 5, 6, 7, 8, 9 and 10 should bear the numbers 2, 3, 4, 5, 6, 7, 8, 9, 10 and 11 respectively; and that the said Letters Patent should be read with these corrections therein that the same may conform to the record of the case in the Patent Office.

Signed and sealed this 13th day of October, A. D. 1936.

Seal)

Henry Van Arsdale
Acting Commissioner of Patents.

backing plate and said web, a flexible conduit secured at its end to the backing plate and communicating at said end with the brake chamber and forming in effect a flexible extension of the brake chamber, and a flexible tension element extending through said conduit into the brake chamber and there connected to said applying device.

10. A brake comprising a drum and a backing plate jointly forming a substantially closed brake chamber, friction means within said chamber having separable ends and having a curved friction face engageable with the drum and having a stiffening web paralleling the backing plate, an applying device acting on said ends and bodily movable independently of the backing plate and arranged in the space between the backing plate and said web, and a flexible tension element extending through said backing plate into the brake chamber and there connected to said applying device.

VINCENT BENDIX.
LUDGER E. LA BRIE.

CERTIFICATE OF CORRECTION.

Patent No. 2,028,583.   January 21, 1936.

VINCENT BENDIX, ET AL.

It is hereby certified that error appears in the printed specification of the above numbered patent requiring correction as follows: Page 3, first column, line 48, after the words and colon "We claim:" insert the following as claim 1:

> 1. A brake comprising, in combination, friction elements spaced apart at adjacent ends by applying means comprising a bell-crank lever pivoted to one end of one of said elements, said lever having one of its arms offset from the plane of the lever and further provided at its offset end with a laterally directed slotted end piece.

The claims now appearing in the patent as numbers 1, 2, 3, 4, 5, 6, 7, 8, 9 and 10 should bear the numbers 2, 3, 4, 5, 6, 7, 8, 9, 10 and 11 respectively; and that the said Letters Patent should be read with these corrections therein that the same may conform to the record of the case in the Patent Office.

Signed and sealed this 13th day of October, A. D. 1936.

Henry Van Arsdale
Acting Commissioner of Patents.

Seal)